Feb. 13, 1968

C. B. HAEGERT 3,369,215

BATTERY TERMINAL CLAMP FOR EMERGENCY AND/OR
PERMANENT CABLE CONNECTION

Filed Feb. 11, 1966

INVENTOR
Clarence B. Haegert

BY Shoemaker and Mattare

ATTORNEYS

United States Patent Office 3,369,215
Patented Feb. 13, 1968

3,369,215
BATTERY TERMINAL CLAMP FOR EMERGENCY
AND/OR PERMANENT CABLE CONNECTION
Clarence B. Haegert, P.O. Box 318,
Coffeyville, Kans. 67337
Filed Feb. 11, 1966, Ser. No. 526,876
7 Claims. (Cl. 339—230)

ABSTRACT OF THE DISCLOSURE

A battery terminal post has a tapered threaded socket receiving an elongated exteriorly threaded tapered two part jam nut. The jam nut has an axially extending stepped bore. One part of said nut fits into a longitudinal slot which opens into the bore of the other part. Lateral wings are provided on the one part which fit into side slots of the other part. The one part is mounted for inward clamping movement with respect to the bore and the walls of the longitudinal slot of the other part.

This invention relates to improvements in battery terminal post clamps.

More particularly the invention is directed to a battery terminal post clamp which is designed for either emergency use or for effecting a permanent cable connection with a battery terminal post.

Many different types or designs of battern terminal post clamps have been devised for connecting current conducting cables to the battery post. The commonest or most universally employed type of terminal post clamp consists of a split collar to receive the battery terminal post, having spaced extensions between the ends thereof with a connecting bolt between such ends for drawing the collar into tight engagement with the terminal post therein and integral with the collar is an elongate portion having a socket in the outer end thereof in which the cable wires are positioned or the end of the wire cable is inserted, and soldered in place. In this ordinary type of terminal clamp no provision is made for effecting an emergency connection of the cable to the clamp or for effecting the connection of a cable thereto for permanent use, without the employment of soldering equipment.

Modifications of the structure of the conventional battery terminal post clamp of the ordinary type above referred to, have been made whereby a battery cable may be coupled to the clamp and, in addition, provision has been made in the conventional clamps for attaching light wires thereto, but no terminal post clamp has heretofore been devised wherein the usual heavy cable may be secured in the socketed end of the clamp body quickly and positively without soldering for use as a permanent installation or for making an emergency connection between the wire and the terminal post clamp.

A principal object of the present invention is to provide a new and improved battery terminal post clamp having means whereby a firm and tight emergency connection may be made between the clamp and a battery cable.

Another object of the invention is to provide an improved battery terminal post clamp of a design which provides for an easy and quick firm connection between the same and a current conductor and which connection, while entirely effective as an emergency connection, may also be employed as a permanent connection or installation without further operation or treatment or which may be soldered, if desired, although such soldering is not necessary.

A still further object of the invention is to provide an improved battery terminal post clamp which is adapted for effecting the connection or coupling therewith of battery cables of different sizes and wherein, in each case, the selected cable size is firmly and tightly gripped for establishing a perfect electrical coupling between the cable and clamp and a coupling which will not work free or become loose in use as a result of vibration or other rough treatment.

The invention more particularly is directed to a battery terminal post clamp in which the socketed shank carried by the split collar, which receives the terminal post, is internally screw threaded and receives a tapered, threaded clamping or jam nut formed in two interlocking parts or sections between which sections the end of the battery cable is positioned prior to the threaded insertion of the jam nut into the socket of the shank, to be tightly squeezed or gripped between the nut sections as the same are forced tightly together as a result of the threading of the jam nut into the shank socket.

It is a further object of the invention to provide a battery terminal clamp structure of the character above described, with auxiliary means for attaching another wire or other wires to the socketed shank.

The invention will be best understood from a consideration of the following detailed description taken in connection with the accompanying drawing, wherein.

Figure 1:
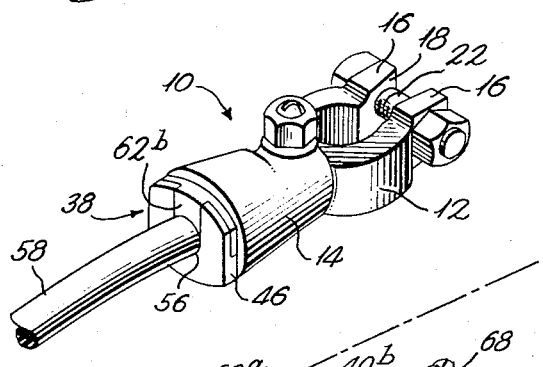
FIG. 1 is a view in perspective of the improved battery terminal clamp of the present invention showing the parts thereof in assembled relation with an end of a battery cable secured thereto.

Referring now more particularly to the drawing wherein like numerals of reference indicate corresponding parts throughout the several views, the numeral 10 generally designates a battery terminal clamp constructed in accordance with the preferred design or construction of the present invention.

The illustrated clamp embodies the split collar 12 which is formed integral with the elongate socketed shank 14.

The collar 12 is more or less of conventional form having the two terminal legs 16 extending from opposite sides of the split. The inner surfaces of the legs 16 are spaced a substantial distance apart and such inner surfaces or faces extend from the collar in divergent relation as indicated at 18. The legs 16 are provided with suitable aligned openings 20 for the extension therethrough of the threaded shank portion 22 of a headed bolt 24 which normally bears against the outer side of one leg and receives upon its opposite end which projects beyond the outer side of the other leg, the nut 26 whereby the legs are drawn together to contract the split collar about and into clamping relation with a battery terminal post, not shown.

Figure 3:
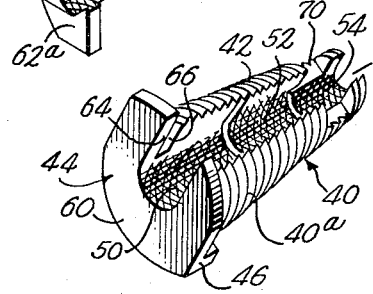
FIG. 3 is a longitudinal section through the shank portion of the clamp structure, the section being taken in a vertical plane and showing the connection of a light weight battery cable therewith such as a conventional 12-volt cable.
Figure 4:
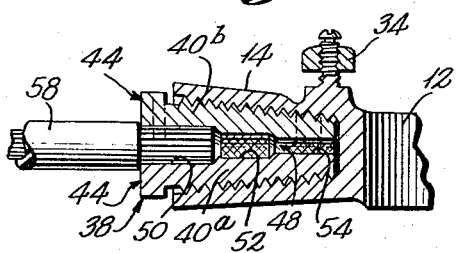
FIG. 4 is a longitudinal section corresponding to FIG. 3 but showing the connection with the clamp of the terminal end of a heavier weight battery cable such, for example, as a "0" gauge cable.

The shank portion 14 of the clamp structure is of generally circular cross section and extends from the back of the split collar, by which is meant the side of the split collar opposite the bolt and the shank is generally of conical form, the smaller end thereof being joined to the collar as shown while the larger outer end has formed therein the socket 28 which tapers inwardly toward the smaller end, as is clearly shown in FIGS. 3 and 4, and is screw threaded as indicated at 30.

Adjacent to its inner end the shank carries a threaded post or stud 32 which is, as shown, preferably parallel with the axis of the circular inside portion of the collar 12 in which the battery terminal post is positioned in the use of the clamp. This stud 32 receives a binding nut 34 whereby an auxiliary wire connection may be established with the clamp and also the stud is drilled and tapped to receive a set or binding screw 36 as shown.

The secure attachment of an end of a battery cable to the clamp device is effected by means of a novel divided clamping or jam nut which is generally designated 38 and which is tapered and screw threaded for insertion into the tapered socket 30 as illustrated.

The jam nut 38 has the elongate tapered body which is designated as a whole by the reference character 40 and which is externally screw threaded through the major portion of its length from the smaller end to the larger end, as indicated at 42. The larger end of the jam nut terminates in a relatively wide flat head 44 which is of substantial thickness and which is formed with at least two opposite flats 46 designed to facilitate the attachment of a tool to the jam nut for tightening the latter in operative position in the socket 28.

As stated, the jam nut is designated as a whole by the reference character 40 but the nut is longitudinally divided into the two parts 40a and 40b which are formed to be interlocked one with the other to provide the complete nut body.

The complete nut body has an axial stepped bore therethrough as indicated at 48. The bore diameter is stepped down in three elongate parts or sections beginning with the section or part 50 of largest diameter in the outer or head end of the body 40 and then proceeding to the part or section 52 of intermediate or smaller diameter, and terminating in the part or section 54 of smallest diameter.

Figure 2:
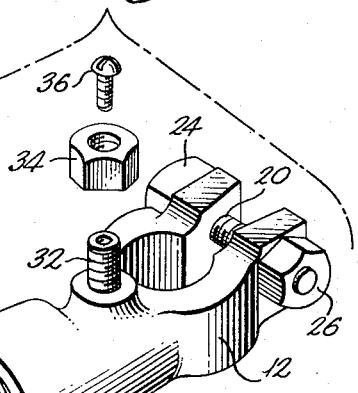
FIG. 2 is an exploded view in perspective and on an enlarged scale of the clamp structure.

As is clearly shown in FIGS. 1 and 2, the head of the jam nut, generally designated 44, peripherally defines an area approximating or only slightly less than the circular area defined by the larger end of the socket 14. And the larger diameter portion 50 of the bore opens through the head, forming when the two parts of the jam nut are assembled, the circular opening 56, this being, of course, the outer end of the part 50 of the bore through which the wire of the battery cable passes into the bore 48, the numeral 58 generally designating, in FIG. 1, a portion of a battery cable extending into the bore or, having the wires extending from an insulation stripped portion of the cable into one of the parts of the bore as shown in FIGS. 3 and 4.

The head 44 of the jam nut is divided into the larger outer part 60 and the smaller inner part 62. The inner part has two opposite wing portions 62a which are in a common plane transversely of the smaller part 40b of the jam nut, and a centrally located thick portion 62b which projects rearwardly beyond the wings 62a and is of a width to close a portion of the recess 64 which is formed in the larger outer part 60 of the head.

When the two parts 40a and 40b of the jam nut are assembled, the wing parts 62a will enter transverse slots 66 formed transversely of the larger part 40a of the nut and the thick central part 62b of the nut part 40b or of the smaller inner part 62 of the head, will enter the recess 64.

The transverse slots 66 are between the larger part 60 of the head and the threaded portion of the body thereof as is clearly shown in FIGS. 1 and 2.

Figure 5:
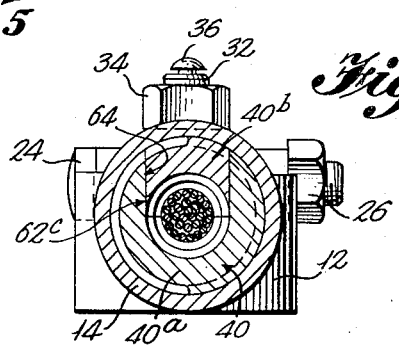
FIG. 5 is a transverse section taken substantially on the line 5—5 of FIG. 3.

As is shown in FIGS. 2 and 5, the opposite sides of the recess 64 and the opposing side faces 62c of the thick part 62b, are tangent to the circle defined by the opening 56. While these faces are preferably parallel, as here shown, they could be somewhat convergent toward the bore if desired without departing from the spirit of the invention.

The side faces of the longitudinally extending part of the smaller part 40b of the jam nut are, in the areas of the different diameter parts of the bore, tangent to the circles defined by these different diameters. Thus when the jam nut part 40b is inserted into the longitudinal channel which is available when the smaller part is detached from the larger part 40a of the nut, the threaded exterior surface form or contour will be complete and the entire tapered nut in the threaded portion thereof may be introduced into the tapered threaded bore 28 of the shank portion 14 of the clamp.

In addition to the locking action obtained by the engagement of the wings 62a of the smaller head part 62 in the transverse slots 66, an additional locking between the two parts 40a and 40b is effected by means of the two integral radially extending lugs 68 forming a part of the smaller end of the tapered threaded portion of the jam nut which, in the assembling of the two parts 40a and 40b, enter the transverse slots 70. It will also be apparent from FIG. 2 that each of the two parts 40a and 40b of the jam nut body presents a semi-circular surface of each of the parts 50, 52 and 54 to a like or mating surface on the other part whereby, when the two parts 40a and 40b are assembled in locking relationship, the opposing mating semi-circular surfaces will form the complete circular areas of the different diameters to receive the ends of wires of different sizes.

From the foregoing description, it is believed that the manner in which the present invention functions for securing the ends of battery cables to the battery terminal post clamp, will be clearly obvious, and while this is thought to be so, the manner of using the clamp for different size wires will be described.

As set forth in the description and as shown in the illustration of the device, there are provided in the complete binding nut structure which is threadably secured in the tapered socket 28, different sections of the bore which have different diameters and these sections of the bore 48 are of decreasing diameter from the outer end of the jam nut to the smaller inner end thereof. Each of these diameters is dimensioned to receive an end of the wire portion of a battery cable of a particular diameter or of a particular weight as, for example, the three sections 50, 52 and 54 of the bore 48 would be dimensioned to respectively receive "0" gauge wire, No. 1 heavy industrial wire (6-volt) cable and 12-volt cable.

The diameters of the cable receiving portions of the jam nut are, of course, smaller than the diameters of the cable or cable wires to be secured therein. Thus in making the connection, the two parts 40a and 40b of the jam nut are separated as shown in FIG. 2 and a portion of the end of the insulation stripped cable is laid into the proper section of the bore provided to receive it. The smaller part 40b is then dropped into the open channel-like portion of the part 40a so that the wings 62a of the head of the jam nut and the lugs 68 at the smaller end of the portion 40b will enter their respective recesses, the part 62b entering between the spaced edges 64 so as to lock the two parts of the jam nut together. The jam nut when thus assembled with the wire is introduced into the socket 28 and the socketed portion is screwed up on the end of the nut and in this operation the two parts of the jam nut will be forced tightly together so as to firmly grip or squeeze the ends of the cable wires in the jam nut in a strong non-slipping friction grip to further insure a non-slipping grip. The surface of the bore in the two parts thereof may be modified as by imparting a knurling or embossing thereto as illustrated in FIG. 2. While such knurling or embossing is not essential to the satisfactory operation of the device in gripping the end of the cable, by imparting such roughening to the surface of the bore obviously it would add to the efficiency of the device.

The clamp collar may then be secured on the battery terminal post in the conventional manner.

The connection thus made between the terminal post clamp and the end of the battery cable is then of such firmness or tenacity that the connection may be maintained and used as a permanent connection. However, if desired, after the connection has been established in the manner described, a conventional soldering procedure may be instituted to solder-lock the wire, jam nut and socket of the clamp firmly together.

From the foregoing it will be seen that there is provided by the present invention a unique battery terminal clamp which can be easily and quickly assembled and by which a quick emergency connection can be effected between a cable and a clamp and wherein such connection between the cable and the clamp will be of a strong and durable character. Additionally, it will be readily apparent that the clamp when made in one size or as one unit may be employed for attaching either as an emergency procedure or as a permanent job, any one of several different cables of different sizes, to a terminal.

As this invention may be embodied in several forms without departing from the spirit or essential characteristics thereof, the present embodiment is therefore illustrative and not restrictive, since the scope of the invention is defined by the appended claims rather than by the desciption preceding them, and all changes that fall within the metes and bounds of the claims or that form their functional as well as conjointly cooperative equivalents, are therefore intended to be embraced by those claims.

What is claimed is:

1. A battery terminal post clamp comprising a body, means thereby for attaching the same to a battery terminal post, the body having a tapered threaded socket therein, and means for securing to the body an end portion of a battery cable, comprising an elongate tapered jam nut body having an axial bore therethrough and having external screw threads thereon extending through the major part of its length toward the tapered end thereof for threaded extension into said socket, said nut body being in two, separable, longitudinal parts formed to interfit one into the other, one of said parts being larger than the other, said larger part having a longitudinal slot therein having parallel side walls which are tangent to the walls of the bore, and a transverse slot adjacent one end thereof, said smaller part having side walls and laterally extending wing portions cooperating with said longitudinal and transverse slots respectively, said wing portions having threads thereon, said last named threads, when in operative position in said socket, being in substantial alignment with threaded portions on said larger part of said nut, each of said parts having an inner surface forming a portion of said bore; the said parts when joined to one another in operative interfitting relationship, and with an end portion of the battery cable extending into the end of the bore at the opposite end of the body from the tapered end, being forced together to grip said end portion of said cable incident to the screw threaded extension of the tapered end of the nut body into said threaded socket to jam the nut body into said socket and force said parts into the said interfitting relationship.

2. The invention according to claim 1, wherein said nut body has a head upon the larger end thereof.

3. The invention according to claim 1, wherein said nut body has a head upon the larger end thereof, the head being partially divided into an outer part and an inner part, the said outer part of the head being integral with one of said longitudinal parts of the nut body and the said inner part of the head being integral with the other one of the longitudinal parts of the nut body and having laterally projecting wing portions interfitting in slots in the said one of said longitudinal parts of the nut body when the two said longtiudinal parts are joined in the said operative interfitting relationship, and securing the two said longitudinal parts against relative longitudinal movement.

4. The invention according to claim 1, wherein said bore from the larger end of the nut body toward the smaller end thereof is stepped down in sections from a larger to a smaller diameter for selectively securing therein end portions of cables of different diametral sizes, and wherein said parallel side walls are correspondingly stepped to maintain tangency to said stepped bore.

5. A battery terminal post clamp, comprising a body, means carried thereby for attaching the same to a battery terminal post, the body having a tapered threaded socket therein, and means for securing to the body an end portion of a battery cable, comprising an elongate tapered jam nut body having an axial bore therethrough and having external screw threads thereon extending through the major part of its length toward the tapered end thereof for threaded extension into said bore, said nut body being in two, separable, longitudinal parts formed to interfit one into the other, each of said parts having an inner surface forming a portion of said bore, the said parts when joined to one another in operative interfitting relationship, and with an end portion of the battery cable extending into the end of the bore at the opposite end of the body from the tapered end, being forced together to grip said end portion of said cable incident to the screw threaded extension of the tapered end of the nut body into said threaded socket to jam the nut body into said socket and force said parts into the said interfitting relationship, said nut body having a head upon the larger end thereof, the head being partially divided into an outer part and an inner part, the said outer part of the head being integral with one of said longitudinal parts of the nut body and said inner part of the head being integral with the other one of the longitudinal parts of the nut body and having laterally projecting wing portions interfitting in slots in the said one of said longitudinal parts of the nut body when the two said longitudinal parts are joined in the said operative interfitting relationship, and securing the two said longitudinal parts against relative longitudinal movement, the said inner part of the head body having a thickened central portion fitting into a recess in the said outer part of the head body, and said thickened portion and said wing portions have opposite, outer and inner surfaces substantially flush respectively with adjacent outer and inner surfaces of the said outer part of the head body whereby the head body has substantially one thickness throughout.

6. A battery terminal post clamp, comprising a body, means carried thereby for attaching the same to a battery terminal post, the body having a tapered threaded socket therein, and means for securing to the body an end portion of a battery cable, comprising an elongate tapered jam nut body having an axial bore therethrough and having external screw threads thereon extending through the major part of its length toward the tapered end thereof for threaded extension into said bore, said nut body being in two, separable, longitudinal parts formed to interfit one into the other, each of said parts having an inner surface forming a portion of said bore, the said parts when joined to one another in operative interfitting relationship, and with an end portion of the battery cable extending into the end of the bore at the opposite end of the body from the tapered end, being forced together to grip said end portion of said cable incident to the screw threaded extension of the tapered end of the nut body into said threaded socket to jam the nut body into said socket and force said parts into the said interfitting relationship, one of the said two parts having two longitudinal side faces in meeting contact with longitudinal faces of the other one of the two parts when said parts are joined in said interfitting relationship, the planes of said meeting faces each being tangent to said bore, said planes of said meeting faces being in substantially parallel relationship, said longitudinal parts of the nut body having a first interlocking means therebetween comprising opposite laterally extending elements carried by one part at the smaller end of the nut body and transverse slots in the other part receiving said elements, said nut body having a head upon the larger end thereof, the head being partially divided into an outer part and an inner part, the said outer part of the head being integral with one of said longitudinal parts of the nut body and the said inner part of the head being integral with the other one of the longtiudinal parts of the nut body and having laterally projecting wing portions interfitting in slots in the said one of said longitudinal parts of the nut body when the two said longitudinal parts are joined in the said operative interfitting relationship forming a second interlocking means, the said first and second interlocking means securing the two said longitudinal parts against relative longitudinal movement, said bore from the larger end of the nut body toward the smaller end thereof being stepped down in sections from a larger to a smaller diameter for selectively securing therein end portions of cables of different diametral sizes, and said bore having the surface thereof embossed formed to provide a non-slipping engagement with a cable end portion, by a knurling, embossing and the like.

7. The invention as defined by claim 6, wherein the said inner part of the head body has a thickened central portion fitting into a recess in the said outer part of the head body, and said thickened portion and said wing portions having opposite, outer and inner surfaces substantially flush respectively with adjacent outer and inner surfaces of the said outer part of the head body whereby the head body has substantially one thickness throughout.

References Cited

UNITED STATES PATENTS

| | | | |
|---|---|---|---|
| 1,000,031 | 8/1911 | Mattman | 339—258 X |
| 1,770,748 | 7/1930 | Dawson et al. | 339—230 |
| 1,980,893 | 11/1934 | Walde | 339—230 X |
| 2,418,164 | 4/1947 | Corley | 339—268 |
| 2,673,971 | 3/1954 | Kacmar | 339—268 |
| 3,230,499 | 1/1966 | Haegert | 339—230 |

MARVIN A. CHAMPION, *Primary Examiner.*

P. TEITELBAUM, *Assistant Examiner.*